(12) United States Patent
Lappöhn

(10) Patent No.: US 7,033,084 B2
(45) Date of Patent: Apr. 25, 2006

(54) PLUG-IN CONNECTOR BETWEEN A CIRCUIT BOARD AND A BACK PLANE

(75) Inventor: Jürgen Lappöhn, Gammelshausen (DE)

(73) Assignee: ERNI Elektroapparate GmbH, Adelberg (DE)

( * ) Notice: Subject to any disclaimer, the term of this patent is extended or adjusted under 35 U.S.C. 154(b) by 0 days.

(21) Appl. No.: 10/646,915

(22) Filed: Aug. 22, 2003

(65) Prior Publication Data
US 2004/0197045 A1    Oct. 7, 2004

(30) Foreign Application Priority Data
Aug. 23, 2002   (DE) ................................ 102 39 575

(51) Int. Cl.
*G02B 6/38* (2006.01)
(52) U.S. Cl. ....................................... 385/73; 439/541.5
(58) Field of Classification Search ................. 439/79, 439/76.1, 541.5; 385/73, 33, 92, 44, 78–79, 385/56, 59
See application file for complete search history.

(56) References Cited

U.S. PATENT DOCUMENTS

| 5,091,985 A | 2/1992 | Heidemann ................... 385/33 |
| 6,422,761 B1 * | 7/2002 | Naghski et al. ................ 385/73 |
| 6,425,691 B1 | 7/2002 | Demangone .................. 385/53 |
| 6,430,326 B1 | 8/2002 | Plickert et al. ................ 385/14 |

FOREIGN PATENT DOCUMENTS

| DE | 37 03 423 | 8/1988 |
| DE | 40 03 056 | 8/1991 |
| DE | 199 20 638 | 11/2000 |
| EP | 1 195 629 | 4/2002 |

* cited by examiner

*Primary Examiner*—Javaid H. Nasri
(74) *Attorney, Agent, or Firm*—Collard & Roe, P.C.

(57) ABSTRACT

A plug-in connector for connecting and transmitting signals from a circuit board to a back plane wherein the plug-in connector comprises an optical conductor for transmitting optical signals into the plug-in connector and at least one mirror coupled to the optical conductor for deflecting light at an approximately 90° angle in the plug-in connector. There is also a lens system disposed adjacent to the mirror and coupled to the optical conductor for coupling the light into the plug-in connector. This optical conductor can comprise a plurality of glass fiber lines for coupling in the optical signal. Alternatively, this optical conductor could be lines formed from plastic polymers.

9 Claims, 5 Drawing Sheets

PLUG-IN CONNECTOR BETWEEN A CIRCUIT BOARD AND A BACK PLANE

CROSS REFERENCE TO RELATED APPLICATIONS

This application claims priority under 35 U.S.C. 119 from German Application Serial No. 10239575.6 filed on Aug. 23, 2002.

BACKGROUND OF THE INVENTION

The present invention relates to a plug-in connector for plugging in optical light.

Plug-in connectors for connecting a circuit board with a back plane are known to a person skilled in the art, in many different embodiments. These plug-in connectors connect the back plane with an interchangeable circuit board, whereby both a mechanical connection and a signal transmission take place via the plug-in connector, between the circuit board and the back plane. Thus, this connection usually requires standardized electrical contact connectors transmission lines for transmitting electrical signals from the back plane to the circuit board or back.

Because of the increasing miniaturization of electronic components, as well as the constantly increasing demands with regard to transmission performance, glass-fiber lines have been increasingly used for the transmission of signals. These signals are transmitted not electrically, but rather optically. This design allows significantly increased transmission rates as compared with a conventional electrical means of transmission. Furthermore, using this connection, any interference in the electrical signals as the result of interference or improper shielding in the signal lines is avoided.

Thus, an optical signal connection device for insertions of an insertion frame is known from German Patent DE 40 03 056 A1, wherein an optical signal is transmitted from a first insertion to a second insertion, via a light-wave guide. A laser diode module is used for transmitting.

Furthermore, a FLEXIBLE CIRCUITS WITH STRAIN RELIEF is known from European Patent EP 1 195 629 A2. This device comprises a plug having a plurality of optical fibers arranged in it, which are embedded in a flexible material.

In the case of the plug-in connectors known up to the present, the situation is that an opto-electronic converter is arranged on the back plane, wherein this converter converts the signal coming from the glass-fiber line into an electrical signal, and wherein this signal is passed into the plug and on from there by way of corresponding electrical connections. A converter can be used at the interface between the plug-in connector and the circuit board, if it is desired to pass the signal on, at the circuit board, via an optical means of transmission.

This type of a device, which includes a module for parallel optical data transmission, is known from German Patent No. DE 199 20 638 C2, wherein this module is equipped with a coupling assembly having several optical channels. In addition, converters are provided for optical signal transmission, which emit light into light-wave guide segments.

Furthermore, a multi-pole electrical plug-in connector device is known from DE 37 03 423 C2, in which the light from its light sources is deflected by 90°, via a light guide means, indicated there with reference number 13.

Accordingly, the plug-in connector with its electrical means of transmission represents a bottleneck in the transmission of signals. In addition, because of the opto-electrical conversion, transmission losses always occur, which result in undesirable attenuation or interference of the signal.

Proceeding from this state of the art, a person skilled in the art is confronted with the task of improving a plug-in connector so that it allows loss-free transmission of signals at increased transmission capacity. By using a plug-in connector, optical signals do not need to be converted to electrical signals so that there is increased transmission capacity and a reduced amount of interference errors.

SUMMARY OF THE INVENTION

Thus, the invention relates to a plug-in connector for connecting and transmitting signals from a circuit board to a back plane wherein the plug-in connector comprises means for transmitting optical signals into the plug-in connector and at least one mirror coupled to the transmitting means for deflecting light at an approximately 90° angle in the plug-in connector. There is also a lens system disposed adjacent to the mirror and coupled to the transmitting means, for coupling the light into the plug-in connector.

This means for transmitting optical signals can comprise a plurality of glass fiber lines for coupling in the optical signal. Alternatively, this means for transmitting optical signals could be plastic polymers. These plastic polymers can be arranged in any desired shape in a simple manner and thus they are not sensitive to buckling or binding processes.

In another alternative embodiment of the invention, the means for transmitting optical signals comprises a plurality of prisms, wherein the light beams always run within a same optical medium within the plug-in connector.

In this case, the light is introduced into a prismatic body, whereby it is deflected at one edge of the prism and deflected to the desired exit site out of the plug-in connector. In this connection, the light can either be introduced into the plug-in connector directly by the optical means of transmission that come from the back plane, and passed out again at the circuit board, or vice versa. In addition a means of generating light, preferably laser diodes, are disposed at the interfaces of the plug-in connector, in each instance. This means in turn generates a beam of light that is passed through the plug-in connector, wherein the means of generating light are switched on as a function of the signals that come from the optical means of transmission in the back plane.

Alternatively, the beams of light coupled into the plug-in connector can also be reflected at a reflective surface, for example a triangular prism, and passed to the out-coupling site.

This plug-in connector can comprise essentially two symmetrical halves having a center plane in a plane for transmitting optical signals.

This plug-in connector can also comprise a plug in element or coupler for coupling the plug-in connector to the circuit board or the back plane. Alternatively this plug-in element can be in the form of a clip.

This plug-in connector can also comprise a plurality of standardized MT plugs having a plurality of optical ribbon cables arranged on the back plane in the form of a plurality of glass tube lines via a flat band cable.

This device can also comprise a light seal disposed in an in-coupling point of the optical signal into the plug-in connector.

Preferably, the plug-in connector consists of two essentially symmetrical halves, the parting plane of which lies essentially in the plane in which the optical means of transmission, for example, glass fibers, are arranged. This allows simple production of the two halves of the plug-in connector in the form of injection-molded parts. With this design, glass fiber lines as well as the means for coupling the optical signals coming from the back plane or the circuit board are embedded into the plug-in connector.

BRIEF DESCRIPTION OF THE DRAWINGS

Other objects and features of the present invention will become apparent from the following detailed description considered in connection with the accompanying drawings which disclose examples of the so-called glass model of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
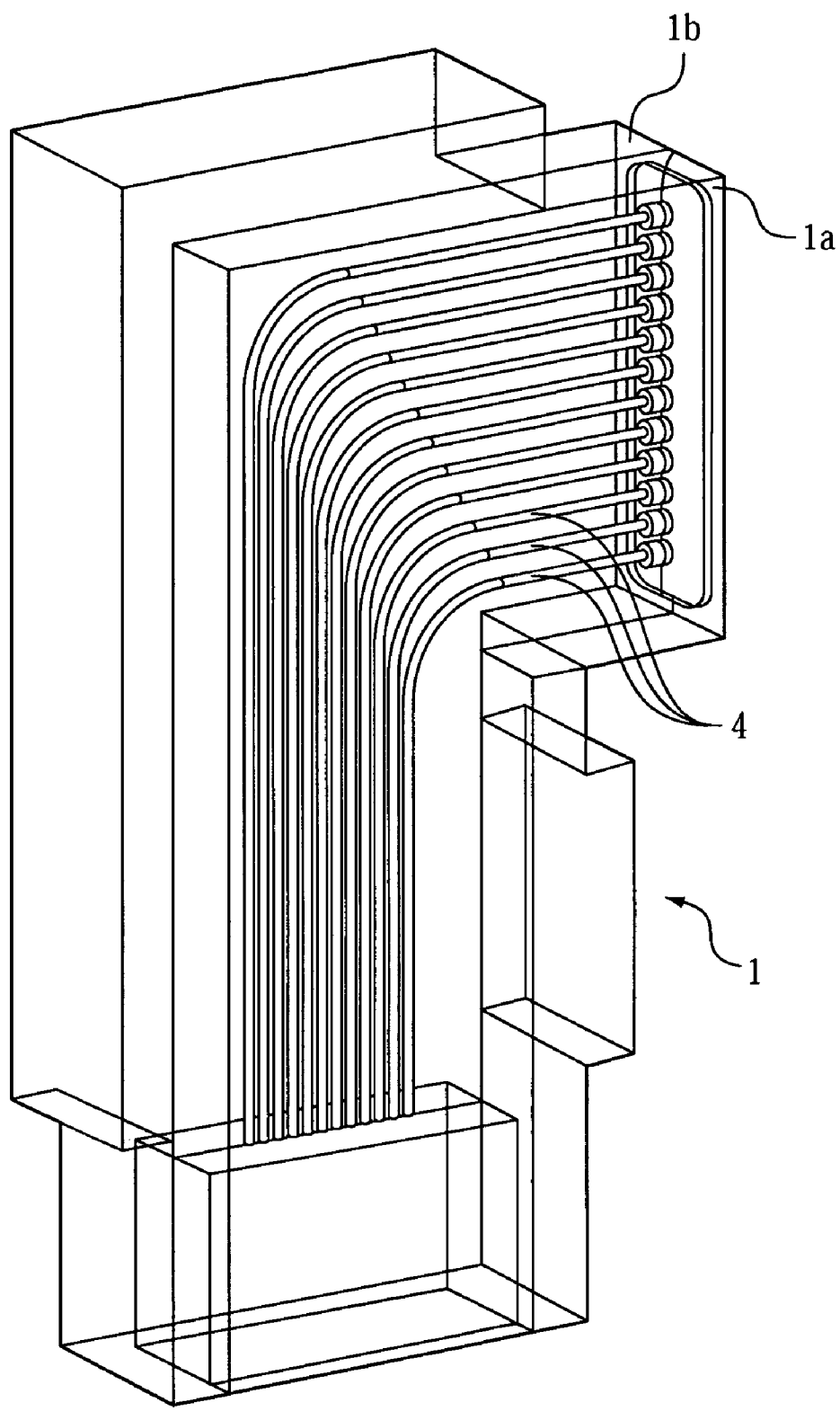
FIG. 1 shows a plug-in connector in a perspective view, with optical signal lines.

Referring in detail to the drawings, FIG. 1 shows a plug-in connector 1 that comprises two symmetrical halves 1a, 1b, preferably in the form of two plastic injection-molded parts. In the center plane of the plug-in connector 1, are arranged glass fiber lines 4 for transmitting optical signals. These glass fiber lines 4 can, however, also be replaced by plastic polymers.

Figure 2:
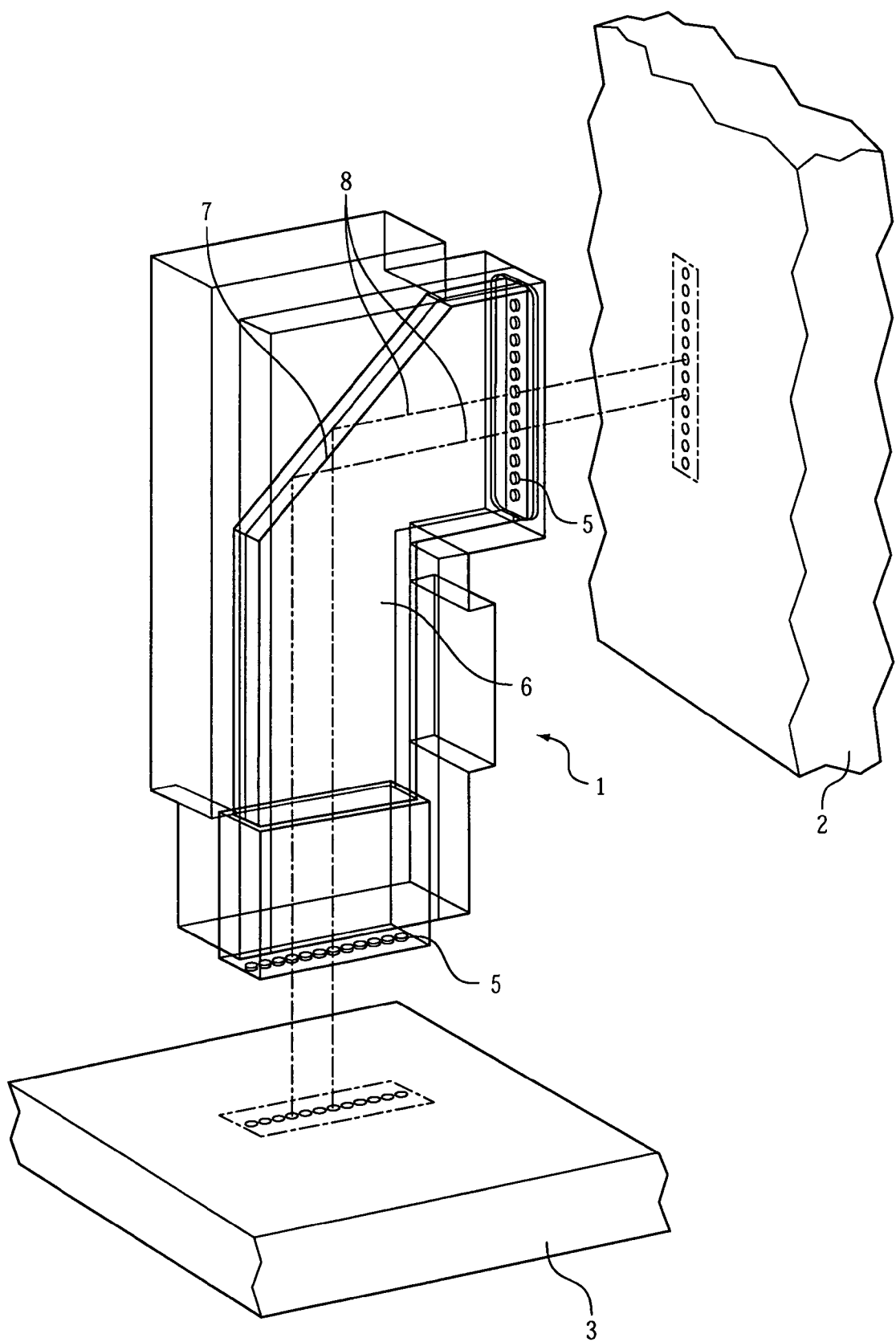
FIG. 2 shows a plug-in connector in a perspective view, with a prismatic body.

FIG. 2, shows another embodiment wherein the optical signal coming from the back plane 3 and/or the circuit board 2 is coupled into the plug-in connector 1 at the in-coupling points 5. In particular, this optical signal is coupled into a prismatic body 6 that has a reflective surface 7.

This reflective surface 7 can be produced, for example, via vapor deposition of a metallic layer that reflects the light. To illustrate the beam path in the plug-in connector 1, several optical paths 8 are drawn in the prismatic body 6 with dash-dotted lines. For this purpose, the incoming optical signal must be bundled in parallel at the in-coupling points 5, wherein this signal is not introduced into the prismatic body 6 in an expanded manner.

Figure 3:
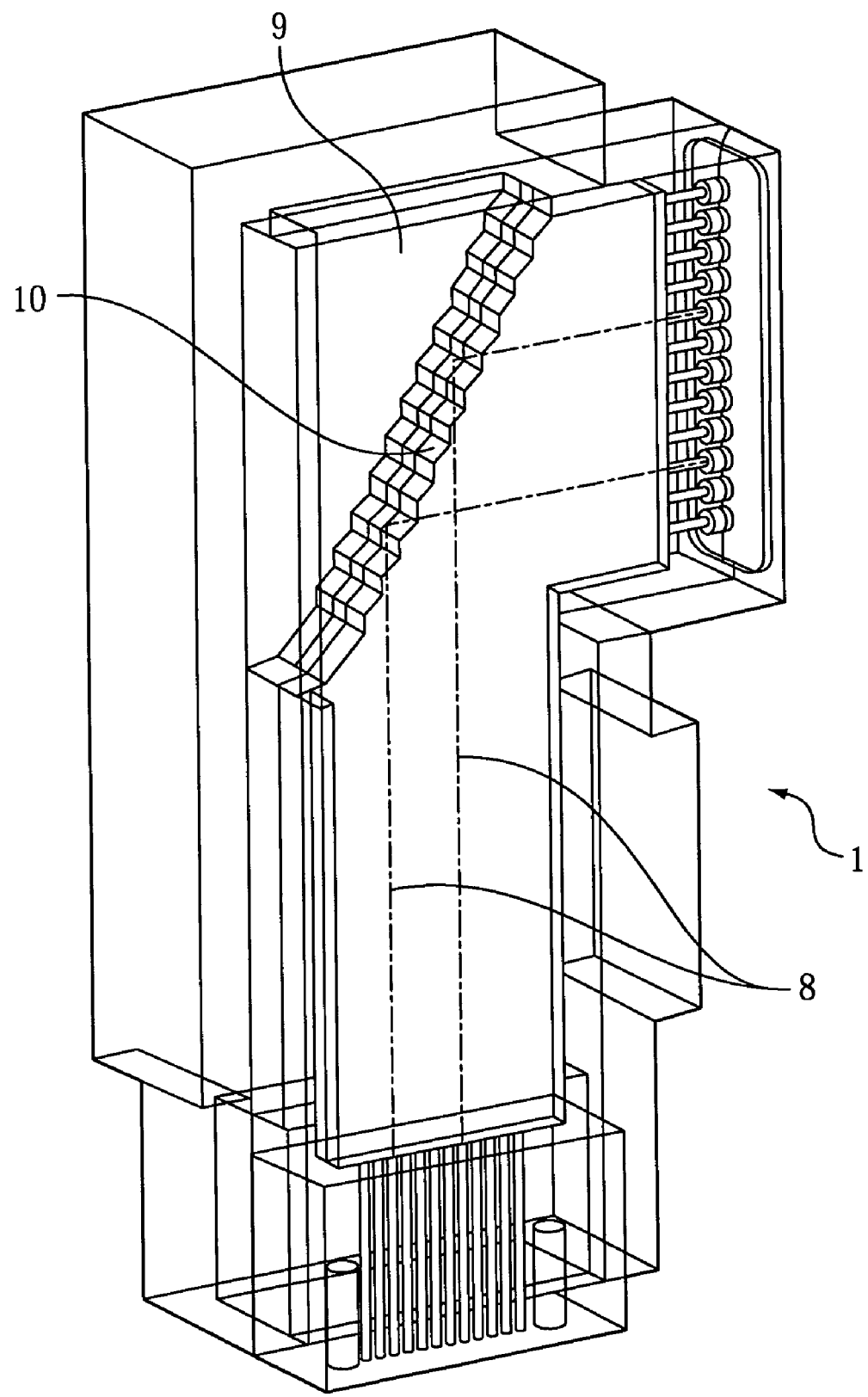
FIG. 3 shows a plug-in connector in a perspective view, with a triangular prism.

FIG. 3 shows that a comparable beam path 8 is also possible in a plug-in connector 1 that has a triangular prism 9. In this connection, the incoming light is reflected at the reflective surface 10 of the triangular prism 9, whereby the reflective surface 10 is either a flat surface or, as shown here, can be structured in stepped form, to improve the reflection, to obtain the best possible alignment for reflection relative to the optical path 8.

In the embodiments of FIGS. 2 and 3, the light must be guided in the plug-in connector 1 in the same medium, so that there is no transition to a different medium within plug-in connector 1. It is important to avoid a transition to another medium, whereby reflection, refraction, or other similar transformation would always occur at such a transition site, because of the change in refraction.

Figure 4:
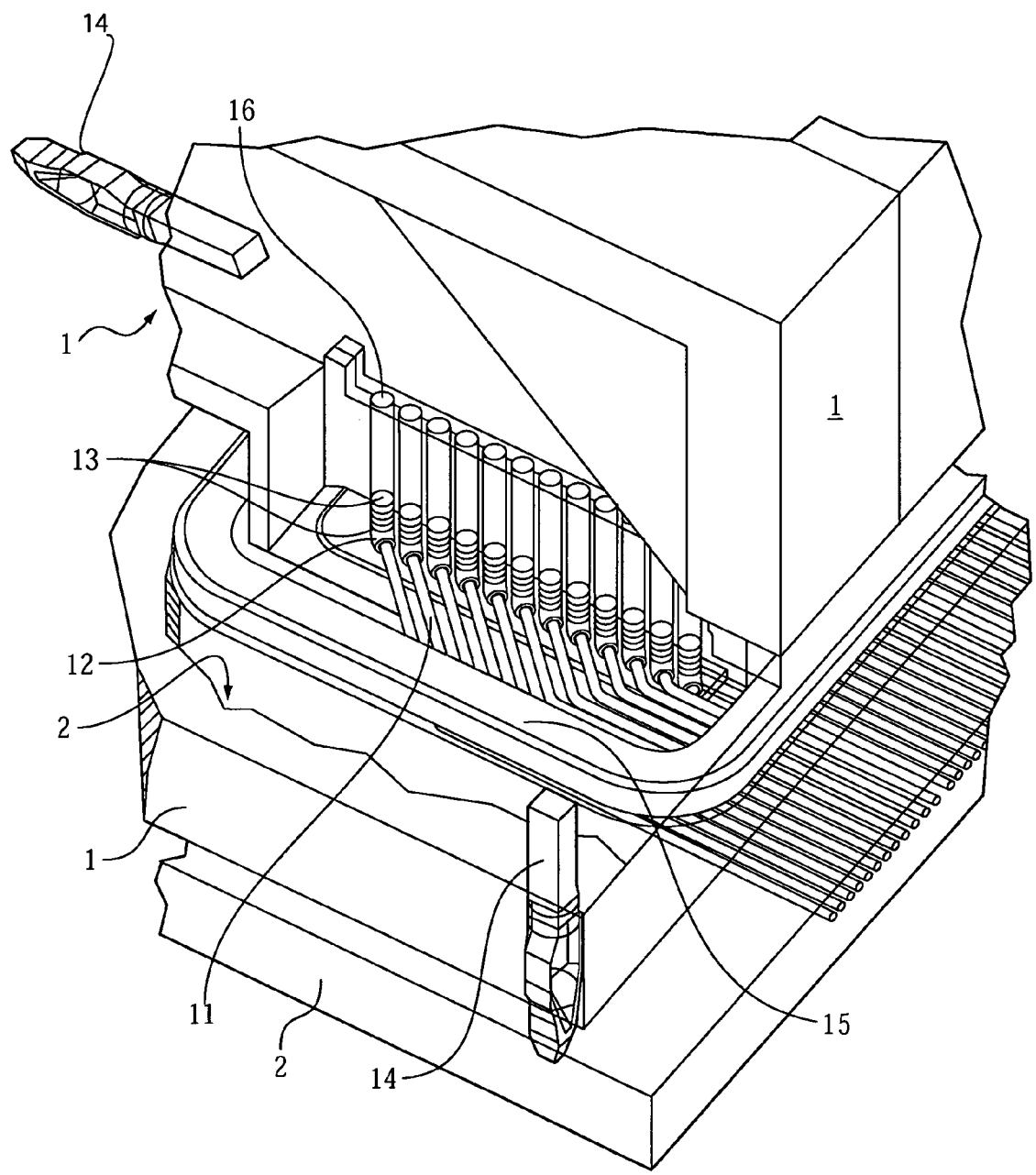
FIG. 4 a plug-in connector in a perspective view, with the optical coupling device.
Figure 5:
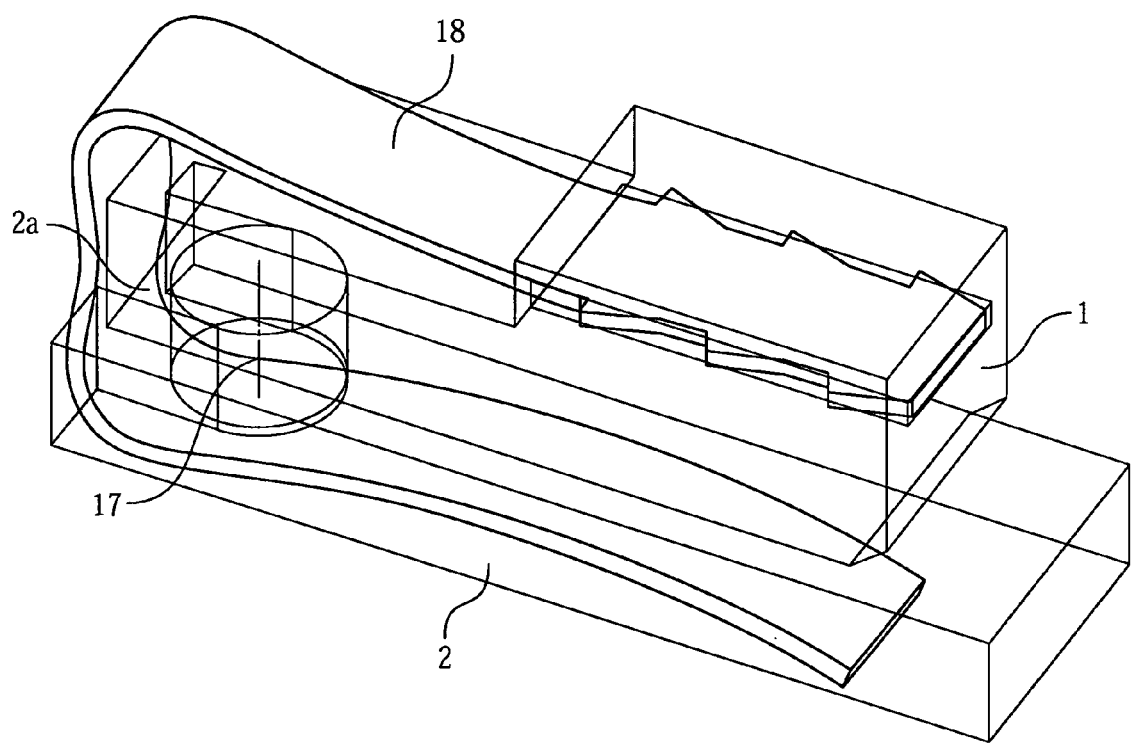
FIG. 5 shows another type of connection between the plug-in connector and a circuit board.

FIG. 4 shows the coupling of the optical signal into the plug-in connector 1 on an enlarged scale. The light coming from glass fiber lines 11 is deflected at a 90° angle at mirrors 12, and coupled into plug-in connector 1 using a lens system 13 that is known to a person skilled in the art. Tubes 16 in plug-in connector 1 which are shown in this embodiment, can hold glass fiber lines 4 or an optically conductive polymer, respectively.

A plug-in element 14 on plug-in connector 1 can attach plug-in connector 1 to a circuit board 2 or a back plane 3, respectively. This plug-in element 14 can be plugged into a corresponding recess in the circuit board 2 and locked in place there, if necessary. This type of attachment can also take place in the opposite way.

To prevent the penetration of light from the outside at the interface between circuit board 2 and plug-in connector 1, there is a continuous circumferential light seal 15. This light seal can be for example, in the form of a rubber band or boundary, which prevents the penetration of light when the plug-in connector 1 is properly connected with the circuit board 2.

The connection between circuit board 2 and plug-in connector 1 can also be formed using a tab 17, molded onto plug-in connector 1. Tab 17 can preferably be produced in one piece with plug in connector 1 so that it is inserted into a U-shaped recess 2a on circuit board 2. In addition, circuit board 2 and plug-in connector 1 are pressed together via a resilient, preferably metal clip 18. In this connection, tab 17 is inserted into recess 2a and prevents further relative movement between circuit board 2 and plug-in connector 1.

REFERENCE SYMBOL LIST 1 plug-in connector
1a, 1b halves of 1
2 circuit board
2a recess in 2
3 back plane
4 glass fiber line in 1
5 in-coupling point in 1
6 prismatic body
7 reflective surface on 6
8 optical path in 6, 9
9 triangular prism
10 reflective surface on 9
11 glass fiber line in 2 or 3
12 mirror
13 lenses
14 plug-in element or coupler
15 light seal
16 tubes in 1
17 tab on 1
18 clip Accordingly, while at least one embodiment of the present invention has been shown and described, it is to be understood that many changes and modifications may be made thereunto without departing from the spirit and scope of the invention as defined in the appended claims.

What is claimed is:

1. A plug-in connector for connecting and transmitting signals in a form of light beams from a circuit board to a back plane, wherein the plug-in connector comprises:

a) means for transmitting optical signals into the plug-in connector in the form of a plurality of glass fiber lines;

b) at least one mirror having a first side adjacent to the back plane and an opposite side adjacent to the circuit board, said at least one mirror being coupled to said transmitting means for deflecting light beams at an approximately 90° angle in the plug-in connector;

c) a lens system disposed adjacent to said first side of said mirror and coupled to said transmitting means, for coupling the light beams into the plug in connector;

wherein said at least one mirror, said lens system and said plurality of glass fiber lines are coupled together in an input plane of said plug; and wherein said plug-in connector is formed as two symmetrical halves having a center plane extending along a plane for transmitting optical signals.

2. The plug-in connector as in claim 1, wherein said means for transmitting optical signals comprises a plurality of prisms, wherein said light beams always run within a same optical medium within said plug-in connector.

3. The plug-in connector as in claim 1, further comprising a plug in coupler for coupling said plug-in connector to the circuit board.

4. The plug-in connector as in claim 1, further comprising a clip for coupling said plug-in connector to the circuit board.

5. The plug-in connector as in claim 1, further comprising a plug in coupler for coupling said plug-in connector to the back plane.

6. The plug-in connector as in claim 1, further comprising a clip for coupling the plug-in connector to the back plane.

7. The plug-in connector as in claim 1, further comprising a light seal disposed in an in-coupling point of the optical signal into the plug-in connector.

8. A plug-in connector for connecting and transmitting signals in a form of light beams from a circuit board to a back plane, wherein the plug-in connector comprises:

a) at least one optical conductor for conducting data in the form of optical signals into the plug in connector, said at least one orptical conductor in the form of a plurality of glass fiber lines;

at least one mirror having a first side adjacent to the back plane and and an opposite side adjacent to the circuit board, said at least one mirror being coupled to said transmitting means for deflecting light beams at an approximately 90° angle in the plug-in connector;

c) a lens system disposed adjacent to said first side of said mirror and coupled to said transmitting means, for coupling the light beams into the plug in connector;

wherein said at least one mirror, said lens system and said plurality of glass fiber lines are coupled together in an input plane of said plug; and wherein said plug-in connector is formed as two symmetrical halves having a center plane extending along a plane for transmitting optical signals.

9. A plug-in connector for connecting and transmitting signals in a form of light beams from a circuit board to a back plane, wherein the plug-in connector comprises:

a) at least one optical conductor for conducting data in the form of optical signals into the plug in connector, said at least one optical conductor in the form of a plurality of polymer lines;

b) at least one mirror having a first side adjacent to the back plane and an opposite side adjacent to the circuit board, said at least one mirror being coupled to said transmitting means for deflecting light beams at an approximately 90° angle in the plug-in connector;

c) a lens system disposed adjacent to said first side of said mirror and coupled to said transmitting means, for coupling the light beams into the plug in connector;

wherein said at least one mirror, said lens system and said plurality of polymer lines are coupled together in an input plane of said plug; and wherein said plug-in connector is formed as two symmetrical halves having a center plane extending along a plane for transmitting optical signals.

* * * * *

UNITED STATES PATENT AND TRADEMARK OFFICE
CERTIFICATE OF CORRECTION

PATENT NO.       : 7,033,084 B2
APPLICATION NO.  : 10/646915
DATED            : April 25, 2006
INVENTOR(S)      : Lappöhn It is certified that error appears in the above-identified patent and that said Letters Patent is hereby corrected as shown below:

Column 5, line 38, (Line 6 of Claim 8), please change "orptical" to correctly read:
--optical--.

In Column 6, line 2 (Line 11 of Claim 8), after the word "plane" please delete: "and".

Signed and Sealed this

Fifth Day of December, 2006

JON W. DUDAS
*Director of the United States Patent and Trademark Office*